May 15, 1956  E. J. RITTER ET AL  2,745,779
METHOD OF MAKING LAMINATED PANELS AND PRODUCT THEREOF
Filed Sept. 18, 1953
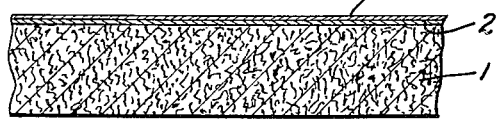
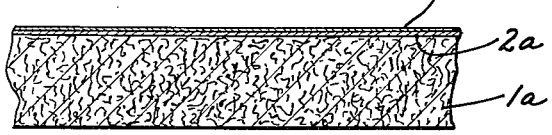
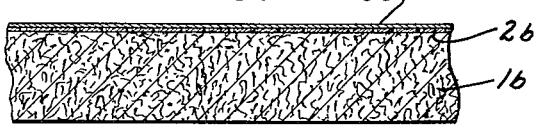
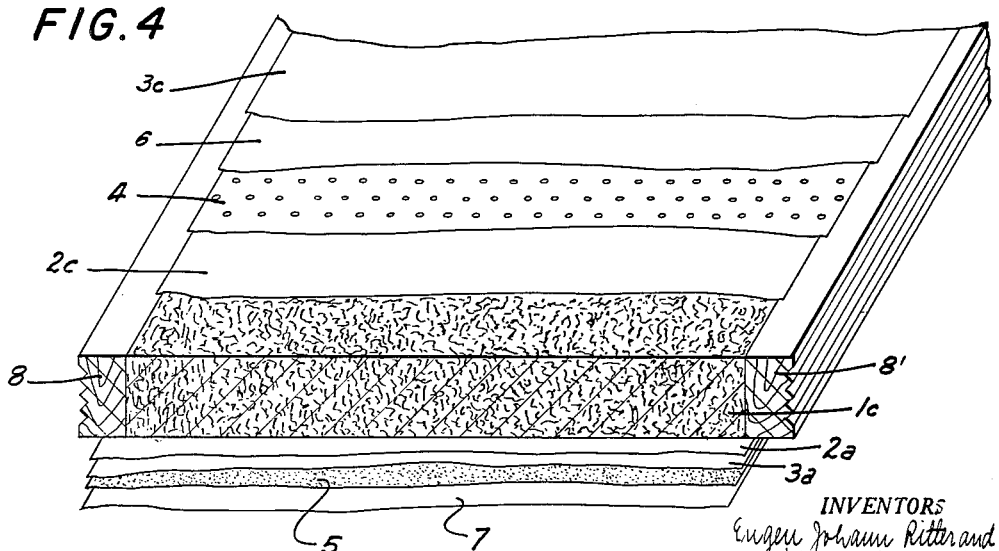
INVENTORS
Eugen Johann Ritter and
Heinz Middendorf
BY Michael S. Striker
Agt ed States Patent Office 2,745,779
Patented May 15, 1956

2,745,779

METHOD OF MAKING LAMINATED PANELS AND PRODUCT THEREOF

Eugen Johann Ritter and Heinz Middendorff, Mainleus, Germany

Application September 18, 1953, Serial No. 381,024

Claims priority, application Germany October 11, 1952

16 Claims. (Cl. 154—118)

The present invention relates to laminated panels. More particularly, the present invention relates to the method of making laminated panels which are formed of a plurality of layers bonded together by synthetic resin material.

It is an object of the present invention to provide laminated panels of the above type which have improved surface properties, such as improved smoothness, density, uniformity, and resistance to chemical and physical attack.

It is another object of the present invention to provide a method of making panels of the above type wherein a minimum amount of pressure and duration of pressure may be used in joining the various layers together.

It is still another object of the present invention to provide a method of making panels of the above type wherein a minimum quantity of adhesive binder may be used for joining the layers together.

Other objects and advantages will become apparent from the description set forth herein and from the appended claims.

Panels of the above type may be formed of a plurality of sheets of paper impregnated with synthetic resin which are compressed at considerable pressure, the assembly first being heated to harden the synthetic resin and then being considerably cooled. Resin bonded coatings of this type have good surface properties and are used for coating panels for cabinet-making purposes or the like, with which they may be glued together in a separate operation. Panels improved in this manner have a great variety of uses such as wall panelling, vehicle body panelling, furniture and the like.

In order to be sufficiently durable, such resin bonded coatings must be formed of a plurality of sheets of high grade paper, and the pressure and heat required for joining the sheets together are comparatively high and the necessary duration thereof is relatively long, and for this reason such coatings are generally rather expensive. They become even more expensive due to the subsequent operation of gluing them onto a supporting panel and by the cost of manufacturing the latter.

In order to reduce the cost of manufacture, sheets of paper, glass fibres, fabrics or other sheet materials impregnated with non-hardened synthetic resin may be applied to one or both sides of a core layer, the coatings and the core then being compressed together with the application of heat for hardening the synthetic resin, after which the finished laminated product is then cooled. By this processes, the resin contained in the coatings joins the coatings securely to the core. Materials used for the core may be natural wood, cork or the like, or chips or fibres of the same provided with a resin bond and compressed to form a coherent core layer, the formation of the core being either a separate operation or performed simultaneously with the lamination pressing operation.

It has been found, in accordance with the present invention, that particularly good surface properties can be provided on panels of the above type having resin bonded coatings combined with the core of chips, fibres or the like by controlling or preventing the diffusion of resin from the coatings into the core. It has been found that migration of part of the resin from the coatings into the core, and the locally different properties of the core and the local elastic recovery of the laminations after pressure has been removed therefrom, prevented the formation of a smooth uniform surface of good density. The method of the present invention, as described herein, avoids the disadvantages mentioned above and avoids the use of an undesirably high number of laminations in forming the laminated product, thereby providing a product of comparatively low specific gravity.

With the above objects in view, the present invention mainly consists in a method of making a laminated panel, comprising the steps of forming an assembly of layers including an outer layer having incorporated therein a latently adhesive binder material, a core layer formed of finely divided particles of solid material and having incorporated therein a latently adhesive binder material, and a separating layer between the outer layer and the core layer adapted to prevent diffusion from the outer layer toward the core layer of a greater amount of binder material in the outer layer when the binder material is plasticized than the amount of plasticized binder material required for joining the layers to each other, and pressing the layers together under heat thereby plasticizing the binder material for securely joining the layers together.

The present invention also consists in the laminated products produced by the above described method.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a cross-section of a laminated panel produced by the method according to the present invention;

Fig. 2 shows a cross-section of another embodiment of a laminated panel produced according to the present invention;

Fig. 3 shows a cross-section of still another embodiment of the present invention; and Fig. 4 is a perspective view partly in section of another embodiment according to the present invention.

In accordance with the invention, it is contemplated that the core be formed, at least for the outside faces thereof, of fibres or chips of relatively small size, even having the fineness of flour, if required. The fibres or chips of the outside face of the core are made so small that there are, during and after the pressing operation, the same characteristics in all sections of the core faces so as to provide a smooth joining face on each of the coatings and uniform elasticity and absorption of the resin diffusing from the coating laminations into the core.

It is an essential feature of the method of the present invention that the process of diffusing of the resin is controlled so that excessive migration of synthetic resin from the outer to the inner coating laminations and to the core is prevented. In one embodiment of the method, this is achieved by an accumulation of resin in the inner coating laminations which is in excess of the quantity required to join the laminations together, the excess of resin being passed during the pressing operation to the core, and there is produced a barrier effect which prevents excessive migration of synthetic resin from the outer coating lamination toward the core.

In a similar manner, in another embodiment of the present invention, the migration of excessive resin from the outer coating lamination to the inner coating laminations and to the core is prevented by providing intermediate layers or coatings which prevent the passage of excessive resin. Various suitable means may be used for such intermediate layers, as for example parchment, metallic foil, specially treated paper, and coatings of paint and chemicals of various types.

The combined features which characterize the present method of producing a smooth joining surface and a uniform elasticity of the core, and of the maintenance of a sufficient quantity of resin on the surface of the product, insure the formation of a dense, uniform, smooth surface, even with only a few laminations, with relatively short pressing time, and a relatively low ram pressure.

It is of particular advantage if the fibres or chips of the core in loose condition are mixed with non-hardened, latently adhesive bonding resins and united with the coating laminations, and then pressed together with the laminations to form panels or moldings, with the application of heat to harden the coating and bonding resins. In the press, such a core, by virtue of the finely divided character of its component particles and by their loose non-cohering condition, displays an almost hydraulic effect, so that in the movement of the small chips or fibres in their integration into a homogeneous structure, the coating laminations are not damaged prior to the hardening of the resins incorporated therein. In addition, the unexpected effect has been observed that even cooling the laminated coatings only by a few degrees centigrade below the temperature at which water evaporates at atmospheric pressure is sufficient to produce the above-mentioned high quality surface.

In a further development of a method of the invention and the product produced thereby, the core is enclosed around its edges before it is pressed either wholly or partially by border strips which may be provided on their inside faces with non-hardened synthetic resin, and which are preferably covered wholly or partially with the coating laminations extending beyond the core layer. Due to the above mentioned hydraulic effect, the fibres or chips of the core, during the pressing operation, are forced against the border strips under sufficient pressure to produce an intimate union between the core and the border strips when being heated. In addition, since the joint between the border strips and the core is covered by the coating laminations, the union between the border strips and the core is made sufficiently strong and is guarded from the penetration of moisture therein.

In order to reduce the cost of the method according to the present invention, it is of advantage to treat the outer coating of the core on one or both sides with a synthetic resin of high quality, preferably a melamine resin, whereas the laminations between the thus treated outer lamination and the core are impregnated with resin binder material of a different quality, the resins used in the laminations closer to the core being less expensive than those used in the laminations further from the core. Such resins include urea resin, phenolic or cresol resin. If in this embodiment of the method the resin of the outer coating laminations is prevented from migrating by inner laminations containing an excessive amount of resin, the resin excess of the intermediate laminations consists of inexpensive resins whose partial migration into the core is of little significance due to the slight cost involved.

If, however, intermediate laminations are used for preventing the passage of resin from the outside coating laminations toward the core layer, then it is possible to use for such intermediate laminations perforated metal foils or coats of substances such as paint, chemicals or the like which are applied to the intermediate laminations or to the core, such latter substances obstructing the passage of or repelling the synthetic resin. When metallic foils or coats of paint, chemicals or other substances such as mentioned above are used in the present method, there is provided the additional feature of dissipation of heat from the laminated coatings, so as to make the laminated product resistant against local heat influences caused, for example, by a lighted cigar or cigarette lying on the material.

Referring now to the drawings, and particularly to Fig. 1 core layer 1 is shown which is formed of finely divided particles of wood which may be in the form of sawdust on the outside faces of the core having the fineness of flour. The sawdust is impregnated, either in the dry or in the wet state, with a bonding resin which is preferably a phenol or a cresol resin. The laminated product shown in Fig. 1, as well as those in Figs. 2 and 3, may be provided with border strips such as shown in Fig. 4. In the Fig. 1 embodiment, a barrier layer 2 is provided between core layer 1 and outer layer 3, barrier layer 2 consisting in this case of a sheet of material having an excess of resin incorporated therein, the resin being of the inexpensive type such as phenol or cresol resin. The outer layer 3 may be impregnated with a higher quality resin such as urea resin or melamine resin. In the first stage of the method according to the present invention, the resin in layers 2 and 3 and in the core layer, as well as on the border strips if any, is not yet hardened. While only one side of the core layer is provided with laminations as shown in Figs. 1–3, both sides of the core layer may be so coated if desired, as shown in Fig. 4.

The synthetic resin of the coating laminations and of the core is hardened by the application of heat only during the pressing operation, the compressed product then being cooled to about 90° to 80° C.

In the form shown in Fig. 1, barrier layer 2 is impregnated with an excess of resin, i. e., with more resin than is necessary for a good union of lamination 2 with the core 1 and with lamination 3. In this form, it is mainly the excess of resin in lamination 2 which migrates into core 1, whereas most of the resin of coating lamination 3 remains in this lamination.

Fig. 2 shows a laminated panel structure similar to that of Fig. 1, but in this form barrier layer 2a consists of a coat of paint provided either on core layer 1a or on outer layer 3a. Such coat of paint has the property of resisting the passage of resin, so that it prevents too much resin from migrating from coating lamination 3a toward and into core layer 1a. Paint layer 2a may consist of such paints as mineral or chemical paints like cadmium or aniline.

Instead of paint, layer 2a may consist of suitable chemicals which resist the passage of resin, such as starch-flour made of potatoes or rye.

Fig. 3 shows a laminated panel structure similar to those of Fig. 1 and 2, but in the Fig. 3 structure barrier layer 2b consists of a perforated metallic foil. Such metallic foil may consist of aluminum, or of any other metal which in sheet form provides a good union with the outer and core layers of the panel structure, while at the same time preventing passage of excess resin into the core layer. Perforations are provided in the metallic foil in order to improve the bonding of the foil with the laminations on either side, the perforations being provided in large numbers and allowing a limited amount of resin to pass through the same between outer layer 3b and core layer 1b, so as to produce resin bridges which securely hold the laminations together in assembled form.

Generally, it is advantageous from the standpoint of strenghtening the panel in its cross-section to provide a higher content of resin on the outer faces of the core layer than in the interior of the layer. In this respect, therefore, it is desirable to allow some migration of resin from the inner coating lamination into the outer faces of the core. For this reason it is desirable to provide a laminated panel structure which has not only a barrier layer such as metal foil 2b or painted coat 2a, but also a barrier layer having an excess of resin arranged between the other barrier layer and the core layer.

Such an arrangement is shown in the embodiment illustrated in Fig. 4. In this figure, core layer 1c is shown provided on one side with layer 2c having excess resin incorporated therein, perforated metal foil 4 overlying lamination 2c, and outer layers 6 and 3c each being impregnated with resin binder material overlying metal foil 4. On the other side of core layer 1c, there is provided a barrier layer 2d containing an excess amount of resin, lamination 3d impregnated with resin binder overlying barrier layer 2d, and outer layer 7 coated on the inner surface thereof with a barrier paint layer 5.

In this type of structure, there is obtained a cross-sectional construction whose outside faces have, by virtue of the girding action of the laminations on each side of the core layer, great tensile strength which decreases toward the neutral plane of the core layer, and it is therefore very well suited to the stress-strain diagram when a bending moment is applied. By variation of the degree of impregnation of resin in laminations 2c and 2d, and of the degree to which laminations 4 and 5 resist passage of the resin, the degree of increase in the strength properties of individual areas of the product can be controlled. Finally, an additional coat of "S-pressing compound" may be used in order to increase the static strength and moisture resistance of the final product. This compound consists of non-hardened phenolic resin powder mixed with wood-flour, which is generally known as non-hardened Bakelite-powder.

As shown in Fig. 4, border strips 8 and 8' are provided around edge faces of the core layer, the border strips being formed of metal or wood and having non-hardened latently adhesive synthetic resin applied to the inside faces thereof. These border strips 8 and 8' are placed against the poured layer of sawdust forming the core and are secured against lateral movement, for example, by a frame fixed to the press plate. Since in this case the poured volume of the core is at first greater than the height of the border strips, it is advisable to first compress the sawdust of core 1c to give it approximately the same height as border strips 8 and 8', the sawdust being at the same time forced into close contact with the resin applied on the inside edge faces of the border strips.

This preliminarily pressed body surrounded by the border strips—or if no border strips are used, the pourable sawdust forming core 1c—is placed on coating laminations 2d which may be impregnated with inexpensive phenol or cresol resin. The coating laminations 3d and 7 which are placed on top of coating lamination 2d are impregnated with a urea resin or melamine resin. In the first stage of the method, as pointed out above, the resin in the laminations is in a non-hardened form and becomes hardened after first being plasticized by heat during the pressing operation compressing the laminations together.

The finely divided particles, chips or fibres of which the interior of the core layer is formed may have individually a length of between 3.0 to 6.0 mm., a width of between 0.6 to 2.0 mm. and a thickness of 0.3 to 0.6 mm. The core layer may have a binding material incorporated therein of synthetic resin which is mixed in liquid non-hardened state with the chips or fibres of the core, so that such a mixture has, after the pressing operation, a content of hard synthetic resin of 8 to 15 per cent by weight.

The coating laminations preferably consist of paper, but other materials may be used, such as sheets of fabric, glass, asbestos, fleece, and the like. The thickness of the paper in panelling of lower quality may be of 50 to 100 g./m.$^2$, one side of the core layer being, if desired, covered with coating lamination of resin impregnated sheets of 100 g./m.$^2$ and on the other side with sheets of 50 g./m.$^2$. In products of higher quality paper sheets having a weight of 150 to 20 g./m.$^2$ may be used.

While generally a pressure of 100 kg./cm.$^2$ is used for compressing synthetic layers of material, it is sufficient in the present process to use a pressure of about 30 kg./cm.$^2$. The temperature during the pressing operation in using phenol or cresol resins is about 140 to 150° C., and in the use of urea and melamine resins is around 110 to 120° C. The duration of the pressing operation is dependent upon the thickness of the product, and the thicker the product, the longer the pressing time required. In general, the pressing time required is 10 to 15 minutes plus ½ minute for each mm. of thickness of the product. If a panel of 16 mm. thickness is to be pressed, it is necessary to press the layers between 18 to 23 minutes.

The following examples of the present process are given for illustrative purposes only and are not intended to limit the scope of the invention in any way.

*Example 1*

A core layer of wood chips is formed with the chips thereof mixed with non-hardened phenol resin binder material, and a sheet of paper impregnated with an excess amount of phenol resin and of a weight of 100 g./m.$^2$ is applied to one side of the core layer. A further sheet of paper of 50 g./m.$^2$ weight impregnated with melamine resin is applied to the first sheet of paper, and the assembly of layers is compressed in a press at 30 kg./cm.$^2$ for about 20 minutes, and at a temperature of about 140° C., and the laminated product is allowed to cool at about 90° C. A finished laminated panel is thereby produced which is of exceptional strength and having an extremely smooth surface.

*Example 2*

A core layer of wood chips is formed impregnated with cresol resin, and outer layers of paper are applied to opposite sides of the core layer, the paper sheets being of a weight of approximately 75 g./m.$^2$ and being impregnated with cresol resin. Perforated metallic foils are applied on the outside surfaces of the paper sheets and further layers of paper sheets are applied to the outer surfaces of the metallic foils, the latter paper sheets being impregnated with urea resin binder material. The assembled layers are pressed together under a pressure of about 50 kg./cm.$^2$ and at a heat of about 145° for about 18 minutes. The laminated product after being thus pressed is cooled at about 80° C., and a finished laminated panel is thereby produced having extremely great strength properties and very smooth surfaces.

*Example 3*

A core layer of wood chips having sawdust on the outer sides thereof is formed, border strips being placed on opposite sides of the core layer, the core layer material being pressed down so that the material closely contacts the inner surfaces of the border strips to which phenol resin binder material has been applied. A sheet of paper impregnated with an excess amount of phenol resin is applied over the core layer overlying the border strips, and an outer sheet of paper impregnated with melamine resin and having its inner surface covered by paint is applied to the inner sheet of paper, and the assembly of layers is pressed together under a pressure of about 40 kg./cm.$^2$ for about 22 minutes at a temperature of about 135° C. After pressing, the laminated product is cooled at a temperature of about 85° C., and a finished laminated panel is produced which has an extremely smooth surface of uniform density and is resistant to chemical and physical attack.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of making a laminated panel, comprising the steps of forming an assembly of layers including an outer layer having incorporated therein a latently adhesive binder material, a core layer formed of finely divided particles of solid material and having incorporated therein a latently adhesive binder material in an amount less than the amount which said core layer is capable of absorbing, and a separating layer between said outer layer and said core layer, said separating layer being adapted to permit diffusion from the outer layer toward the core layer of a sufficient amount of binder material from said outer layer when said binder material is plasticized to join the layers to each other while preventing substantially more than said sufficient amount of binder material from diffusing from said outer layer to said core layer, whereby a saving in binder material is effected while obtaining secure joining of said layers to each other; and pressing said layers together under heat thereby plasticizing said binder material for securely joining said layers together.

2. A method of making a laminated panel, comprising the steps of forming an assembly of layers including an outer layer having incorporated therein a latently adhesive binder material, a core layer being substantially thicker than said outer layer and being formed of loosely arranged finely divided particles of solid material and having incorporated therein a latently adhesive binder material in an amount less than the amount which said core layer is capable of absorbing, and a separating layer between said outer layer and said core layer, said separating layer being adapted to permit diffusion from the outer layer toward the core layer of a sufficient amount of binder material from said outer layer when said binder material is plasticized to join the layers to each other while preventing substantially more than said sufficient amount of binder material from diffusing from said outer layer to said core layer, whereby a saving in binder material is effected while obtaining secure joining of said layers to each other, said separating layer having incorporated therein an amount of latently adhesive binder material greater than the amount of binder material necessary for joining said separating layer to said core layer and to said outer layer; and pressing said layers together under heat thereby plasticizing said binder material for securely joining said layers together.

3. A method of making a laminated panel, comprising the steps of forming an assembly of layers including an outer layer having incorporated therein a latently adhesive binder material, a core layer formed of loosely arranged finely divided particles of solid material and having incorporated therein a latently adhesive binder material in an amount less than the amount which said core layer is capable of absorbing, and a separating layer comprising a perforated metallic foil between said outer layer and said core layer, said separating layer being adapted to permit diffusion from the outer layer toward the core layer of a sufficient amount of binder material from said outer layer when said binder material is plasticized to join the layers to each other while preventing substantially more than said sufficient amount of binder material from diffusing from said outer layer to said core layer, whereby a saving in binder material is effected while obtaining secure joining of said layers to each other; and pressing said layers together under heat thereby plasticizing said binder material for securely joining said layers together.

4. A method of making a laminated panel, comprising the steps of forming an assembly of layers including an outer layer having incorporated therein a latently adhesive binder material, a core layer being substantially thicker than said outer layer and being formed of loosely arranged finely divided particles of wood and having incorporated therein a latently adhesive binder material in an amount less than the amount which said core layer is capable of absorbing, and a separating layer between said outer layer and said core layer, said separating layer being adapted to permit diffusion from the outer layer toward the core layer of a sufficient amount of binder material from said outer layer when said binder material is plasticized to join the layers to each other while preventing substantially more than said sufficient amount of binder material from diffusing from said outer layer to said core layer, whereby a saving in binder material is effected while obtaining secure joining of said layers to each other; and pressing said layers together under heat thereby plasticizing said binder material for securely joining said layers together.

5. A method of making a laminated panel, comprising the steps of forming an assembly of layers including an outer layer having incorporated therein a thermosetting binder material, a core layer formed of finely divided particles of solid material and having incorporated therein a thermosetting binder material in an amount less than the amount which said core layer is capable of absorbing, and a separating layer between said outer layer and said core layer, said separating layer being adapted to permit diffusion from the outer layer toward the core layer of a sufficient amount of binder material from said outer layer when said binder material is plasticized to join the layers to each other while preventing substantially more than said sufficient amount of binder material from diffusing from said outer layer to said core layer, whereby a saving in binder material is effected while obtaining secure joining of said layers to each other; and pressing said layers together under heat thereby plasticizing said binder material for securely joining said layers together.

6. A method of making a laminated panel, comprising the steps of forming an assembly of layers including an outer layer having incorporated therein a synthetic resin binder material, a core layer being substantially thicker than said outer layer and being formed of finely divided particles of solid material and having incorporated therein a synthetic resin binder material in an amount less than the amount which said core layer is capable of absorbing, and a separating layer between said outer layer and said core layer, said separating layer being adapted to permit diffusion from the outer layer toward the core layer of a sufficient amount of binder material from said outer layer when said binder material is plasticized to join the layers to each other while preventing substantially more than said sufficient amount of binder material from diffusing from said outer layer to said core layer, whereby a saving in binder material is effected while obtaining secure joining of said layers to each other; and pressing said layers together under heat thereby plasticizing said binder material for securely joining said layers together.

7. A method of making a laminated panel, comprising the steps of forming a core layer of loosely arranged finely divided particles of solid material and incorporating a latently adhesive binder material therein in an amount less than the amount which said core layer is capable of absorbing; enclosing at least part of the peripheral edge face of said core layer only with frame means adapted to retain binder material in said core layer; forming an assembly of layers including an outer layer having incorporated therein a latently adhesive binder material, said core layer, and a separating layer between said outer layer and said core layer, said separating layer being adapted to permit diffusion from the outer layer toward the core layer of a sufficient amount of binder material from said outer layer when said binder material is plasticized to join the layers to each other while preventing substantially more than said sufficient amount of binder material from diffusing from said outer layer to said core layer, whereby a saving in binder material is effected while obtaining secure joining of said layers to each other; and pressing said layers together under heat thereby plasticizing said binder material for securely joining said layers together.

8. A method of making a laminated panel, comprising the steps of forming an assembly of layers including a pair of outer layers having incorporated therein a latently adhesive binder material, a core layer being substantially thicker than said outer layer and being formed of finely divided particles of solid material and having incorporated therein a latently adhesive binder material in an amount less than the amount which said core layer is capable of absorbing, said core layer being arranged between said outer layers; and separating layers between said outer layers and said core layer; said separating layers being adapted to permit diffusion from the outer layers toward the core layer of a sufficient amount of binder material from said outer layers when said binder material is plasticized to join the layers to each other while preventing substantially more than said sufficient amount of binder material from diffusing from said outer layers to said core layer, whereby a saving in binder material is effected while obtaining secure joining of said layers to each other; and pressing said layers together under heat thereby plasticizing said binder material for securely joining said layers together.

9. A laminated panel, comprising in combination, an outer layer having adhesive binder material incorporated therein; a core layer formed of loosely arranged finely divided particles of solid material and having an adhesive binder material incorporated therein in an amount less than the amount which said core layer is capable of absorbing; and a separating layer between said outer layer and said core layer, said separating layer being adapted to permit diffusion of an amount of binder material from the outer layer to the core layer which is sufficient for joining the layers to each other and to prevent diffusion of a substantially greater amount of binder material than that required for joining said layers to each other, said layers being joined together by the adhesive binder material incorporated therein.

10. A laminated panel, comprising in combination, an outer layer having adhesive binder material incorporated therein; a core layer formed of finely divided particles of solid material and having an adhesive binder material incorporated therein in an amount less than the amount which said core layer is capable of absorbing; and a separating layer between said outer layer and said core layer, said separating layer being adapted to permit diffusion of an amount of binder material from the outer layer to the core layer which is sufficient for joining the layers to each other and to prevent diffusion of a substantially greater amount of binder material than that required for joining said layers to each other, said separating layer having incorporated therein an amount of latently adhesive binder material greater than the amount necessary for joining said separated layer to said core layer and to said outer layer, said layers being joined together by the adhesive binder material incorporated therein.

11. A laminated panel, comprising in combination, an outer layer having adhesive binder material incorporated therein; a core layer formed of loosely arranged finely divided particles of solid material and having an adhesive binder material incorporated therein in an amount less than the amount which said core layer is capable of absorbing; and a separating layer comprising a perforated metallic foil between said outer layer and said core layer, said separating layer being adapted to permit diffusion of an amount of binder material from the outer layer to the core layer which is sufficient for joining the layers to each other and to prevent diffusion of a substantially greater amount of binder material than that required for joining said layers to each other, said layers being joined together by the adhesive binder material incorporated therein.

12. A laminated panel, comprising in combination, an outer layer having adhesive binder material incorporated therein; a core layer being substantially thicker than said outer layer and being formed of finely divided particles of wood and having an adhesive binder material incorporated therein in an amount less than the amount which said core layer is capable of absorbing; and a separating layer between said outer layer and said core layer, said separating layer being adapted to permit diffusion of an amount of binder material from the outer layer to the core layer which is sufficient for joining the layers to each other and to prevent diffusion of a substantially greater amount of binder material than that required for joining said layers to each other, said layers being joined together by the adhesive binder material incorporated therein.

13. A laminated panel, comprising in combination, an outer layer having thermosetting binder material incorporated therein; a core layer formed of finely divided particles of solid material and having thermosetting binder material incorporated therein in an amount less than the amount which said core layer is capable of absorbing; and a separating layer between said outer layer and said core layer, said separating layer being adapted to permit diffusion of an amount of binder material from the outer layer to the core layer which is sufficient for joining the layers to each other and to prevent diffusion of a substantially greater amount of binder material than that required for joining said layers to each other, said layers being joined together by the thermosetting binder material incorporated therein.

14. A laminated panel, comprising in combination, an outer layer having a synthetic resin binder material incorporated therein; a core layer being substantially thicker than said outer layer and being formed of loosely arranged finely divided particles of solid material and having a synthetic resin binder material incorporated therein in an amount less than the amount which said core layer is capable of absorbing; and a separating layer between said outer layer and said core layer, said separating layer being adapted to permit diffusion of an amount of binder material from the outer layer to the core layer which is sufficient for joining the layers to each other and to prevent diffusion of a substantially greater amount of binder material than that required for joining said layers to each other, said layers being joined together by the synthetic resin binder material incorporated therein.

15. A laminated panel, comprising in combination, an outer layer having adhesive binder material incorporated therein; a core layer formed of loosely arranged finely divided particles of solid material and having an adhesive binder material incorporated therein in an amount less than the amount which said core layer is capable of absorbing; frame means adapted to retain binder material in said core layer enclosing at least part of the peripheral edge face of said core layer only; and a separating layer between said outer layer and said core layer, said separating layer being adapted to permit diffusion of an amount of binder material from the outer layer to the core layer which is sufficient for joining the layers to each other and to prevent diffusion of a substantially greater amount of binder material than that required for joining said layers to each other, said layers being joined together by the adhesive binder material incorporated therein.

16. A laminated panel, comprising in combination, a pair of outer layers having adhesive binder material incorporated therein; a core layer being substantially thicker than said outer layer and being formed of finely divided particles of solid material and having an adhesive binder material incorporated therein in an amount less than the amount which said core layer is capable of absorbing, said core layer being arranged between said outer layers; and separating layers between said outer layers and said core layer adapted to permit diffusion of an amount of binder material from the outer layers to the core layer which is sufficient for joining the layers to each other and to prevent diffusion of a substantially greater amount of binder material than that required for joining said layers to each other, said layers being joined together by the adhesive binder material incorporated therein.

References Cited in the file of this patent

UNITED STATES PATENTS

| | | |
|---|---|---|
| 1,439,954 | Emerson | Dec. 26, 1922 |
| 2,011,130 | Ward | Aug. 13, 1935 |
| 2,227,212 | Beck | Dec. 31, 1940 |
| 2,479,342 | Gibbons et al. | Aug. 16, 1949 |
| 2,601,284 | Hemming et al. | June 24, 1952 |
| 2,632,722 | Libberton | Mar. 24, 1953 |
| 2,699,417 | Repsher et al. | Jan. 11, 1955 |

FOREIGN PATENTS

| | | |
|---|---|---|
| 440,578 | Great Britain | Jan. 2, 1936 |

OTHER REFERENCES

Rishell: Abstract of application Serial Number 651,417, published September 26, 1950; 638 O. G. 1234.